(12) United States Patent  
Zhou et al.

(10) Patent No.: US 12,366,267 B2  
(45) Date of Patent: Jul. 22, 2025

(54) ROTOR GROUNDING SYSTEM WITH SACRIFICIAL BEARING

(71) Applicant: GM GLOBAL TECHNOLOGY OPERATIONS LLC, Detroit, MI (US)

(72) Inventors: Sen Jiang Zhou, Troy, MI (US); Jack M Gayney, Grosse Ile, MI (US); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 473 days.

(21) Appl. No.: 17/933,146

(22) Filed: Sep. 19, 2022

(65) Prior Publication Data

US 2024/0097536 A1 Mar. 21, 2024

(51) Int. Cl.

| F16C 41/00 | (2006.01) |
| H02K 5/173 | (2006.01) |
| H02K 11/40 | (2016.01) |

(52) U.S. Cl.  
CPC .......... *F16C 41/002* (2013.01); *H02K 5/1732* (2013.01); *H02K 11/40* (2016.01)

(58) Field of Classification Search  
CPC ...... F16C 41/002; H02K 5/1732; H02K 11/40  
See application file for complete search history.

(56) References Cited

U.S. PATENT DOCUMENTS

| 6,670,733 | B2 | 12/2003 | Melfi |
| 8,183,727 | B2 | 5/2012 | Fee et al. |
| 8,189,317 | B2 | 5/2012 | Oh et al. |
| 8,488,293 | B2 | 7/2013 | Baumann |
| 2010/0127585 | A1* | 5/2010 | Fee .......... H02K 11/40 310/71 |
| 2021/0367467 | A1* | 11/2021 | Graves ......... H02K 5/1732 |

FOREIGN PATENT DOCUMENTS

EP 1300927 A1 4/2003

* cited by examiner

*Primary Examiner* — Christopher M Koehler  
*Assistant Examiner* — Viswanathan Subramanian  
(74) *Attorney, Agent, or Firm* — Lorenz & Kopf LLP (57) ABSTRACT

A rotor grounding system for an electric machine includes a rotor including a shaft assembly configured to rotate about an axis. A housing supports the shaft assembly for rotation of the rotor. A bearing assembly has an outer circumference disposed against the shaft assembly. A discharge bar extends through at least a part of the bearing assembly. The bearing assembly has an inner circumference disposed against the discharge bar. A discharge circuit is defined between the rotor and the housing, where the discharge circuit extends through the bearing assembly and the discharge bar.

20 Claims, 4 Drawing Sheets

ROTOR GROUNDING SYSTEM WITH SACRIFICIAL BEARING

The present disclosure relates to electric current associated deterioration of rotating elements in electric machines such as motors. More specifically, the disclosure relates to systems that avoid current related deterioration through rotor grounding by means of a sacrificial bearing to avoid voltage buildup.

The use of electric motors is widespread, including in vehicle propulsion systems. During operation, electric motors may experience induced voltage differentials that may result in stray currents as the voltage seeks a discharge route. These currents may travel from the motor's rotor to an area of lower potential. The currents resulting from built up voltage may discharge through various paths that may include rotating elements, such as bearing and gears. Effects of the buildup and subsequent discharge may deteriorate the rotating elements through actions such as electric discharge machining and white etching cracking of the bearings and/or gears, both of which may result in certain cases. The effects may include undesirable noise and vibration in the rotating elements.

Mitigating and minimizing effects such as noise and vibration is desirable to increase the lifespan of electrified rotating systems including electrical machines such as motors, and to avoid undesirable noise perceptions by a human, such as an operator of the equipment. For example, in the context of an automobile, such as a passenger vehicle, occupants of a moving vehicle may experience noise, at least to some degree. In some cases, noise and/or vibration may become unpleasant at varying speeds and therefore, is desirably avoided.

It would be desirable to minimize rotating element deterioration related to electric current effects and any resulting noise or vibration in rotating systems in an efficient and effective manner. It would also be desirable that any solutions involve minimal modification of existing motor designs. Furthermore, other desirable features and characteristics of the present disclosure will become apparent from the subsequent detailed description and the appended claims, taken in conjunction with the accompanying drawings and the foregoing introduction.

SUMMARY

Systems provide a bearing configured to discharge voltages, mitigating the effects of current related deterioration of rotating elements. In a number of embodiments, a rotor grounding system for an electric machine includes a rotor including a shaft assembly configured to rotate about an axis. A housing supports the shaft assembly for rotation of the rotor. A bearing assembly has an outer circumference disposed against the shaft assembly. A discharge bar extends through at least a part of the bearing assembly. The bearing assembly has an inner circumference disposed against the discharge bar. A discharge circuit is defined between the rotor and the housing, where the discharge circuit extends through the bearing assembly and the discharge bar.

In additional embodiments, the shaft assembly defines an opening and the discharge bar is disposed in the opening.

In additional embodiments, a support couples the discharge bar with the housing.

In additional embodiments, the shaft assembly includes a shaft that defines a bore and includes an insert that defines a cavity. The discharge bar is disposed in at least one of the bore and/or the cavity.

In additional embodiments, a support couples the discharge bar with the housing. The discharge circuit includes the bearing assembly, the discharge bar and the support.

In additional embodiments, a support couples the discharge bar with the housing. The support is configured to support the discharge bar and is configured to ground the discharge bar to the housing.

In additional embodiments, a support bearing mounted between the shaft assembly and the housing, wherein the support bearing is configured to support the rotor in the housing, wherein the bearing assembly does not support the rotor on the housing.

In additional embodiments, the discharge bar extends along the axis.

In additional embodiments, a support couples the discharge bar with the housing. The discharge bar includes an end that is fixed to the support.

In additional embodiments, an electrically conductive lubricant is disposed around the bearing assembly and is configured to provide a low impedance path from the rotor, through the bearing assembly, and to the housing.

In a number of additional embodiments, a rotor grounding system for an electric machine includes a rotor with a shaft assembly that is configured to rotate about an axis. A housing surrounds the shaft assembly and the shaft assembly is supported for rotation of the rotor in the housing. A bearing assembly has an outer circumference and an inner circumference. The outer circumference is disposed against the shaft assembly with the bearing assembly disposed inside the shaft assembly. A discharge bar extends through at least a part of the bearing assembly. The inner circumference is disposed against the discharge bar, with the discharge bar extending into the bearing assembly. An electric discharge circuit is defined between the rotor and the housing. The electric discharge circuit extends through the bearing assembly and the discharge bar.

In additional embodiments, the shaft assembly defines an opening, with the discharge bar disposed in the opening.

In additional embodiments, a support couples the discharge bar with the housing. The support comprises a part of the electric discharge circuit.

In additional embodiments, the shaft assembly includes a shaft that defines a bore and includes an insert that defines a cavity. The discharge bar is disposed in at least one of the bore and/or the cavity. The at least one of the bore and/or the cavity comprises the opening.

In additional embodiments, a support couples the discharge bar with the housing. The support comprises at least one of a beam extending from the housing and/or a cover engaged with the housing. The electric discharge circuit includes the bearing assembly, the discharge bar and the support.

In additional embodiments, a support couples the discharge bar with the housing. The support is configured to support the discharge bar and to ground the discharge bar to the housing.

In additional embodiments, a support bearing is mounted between the shaft assembly and the housing, with the shaft extending into the support bearing. The support bearing is configured to support the rotor in the housing. The bearing assembly does not support the rotor on the housing.

In additional embodiments, a seal encloses the bearing assembly. An electrically conductive lubricant is disposed around the bearing assembly. The electrically conductive lubricant is configured to provide a low impedance path from the rotor, through the bearing assembly, and to the housing In additional embodiments, a support couples the discharge bar with the housing. The discharge bar includes a first end that is fixed to the support and includes a second end that is supported by the bearing assembly.

In a number of other embodiments, rotor grounding system is provided for an electric machine of a vehicle that has a body. The rotor grounding system includes a rotor that has a shaft assembly configured to rotate about an axis. A housing surrounds the shaft assembly, and the shaft assembly is supported for rotation of the rotor in the housing. A bearing assembly has an outer circumference and an inner circumference. The outer circumference is disposed against the shaft assembly with the bearing assembly disposed inside the shaft assembly. A discharge bar extends through at least a part of the bearing assembly. The inner circumference is disposed against the discharge bar, with the discharge bar extending into the bearing assembly. A support couples the discharge bar with the housing. An electric discharge circuit is defined between the rotor and the body. The electric discharge circuit extends through the bearing assembly, the discharge bar, the support, and the housing.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description.

Figure 1:
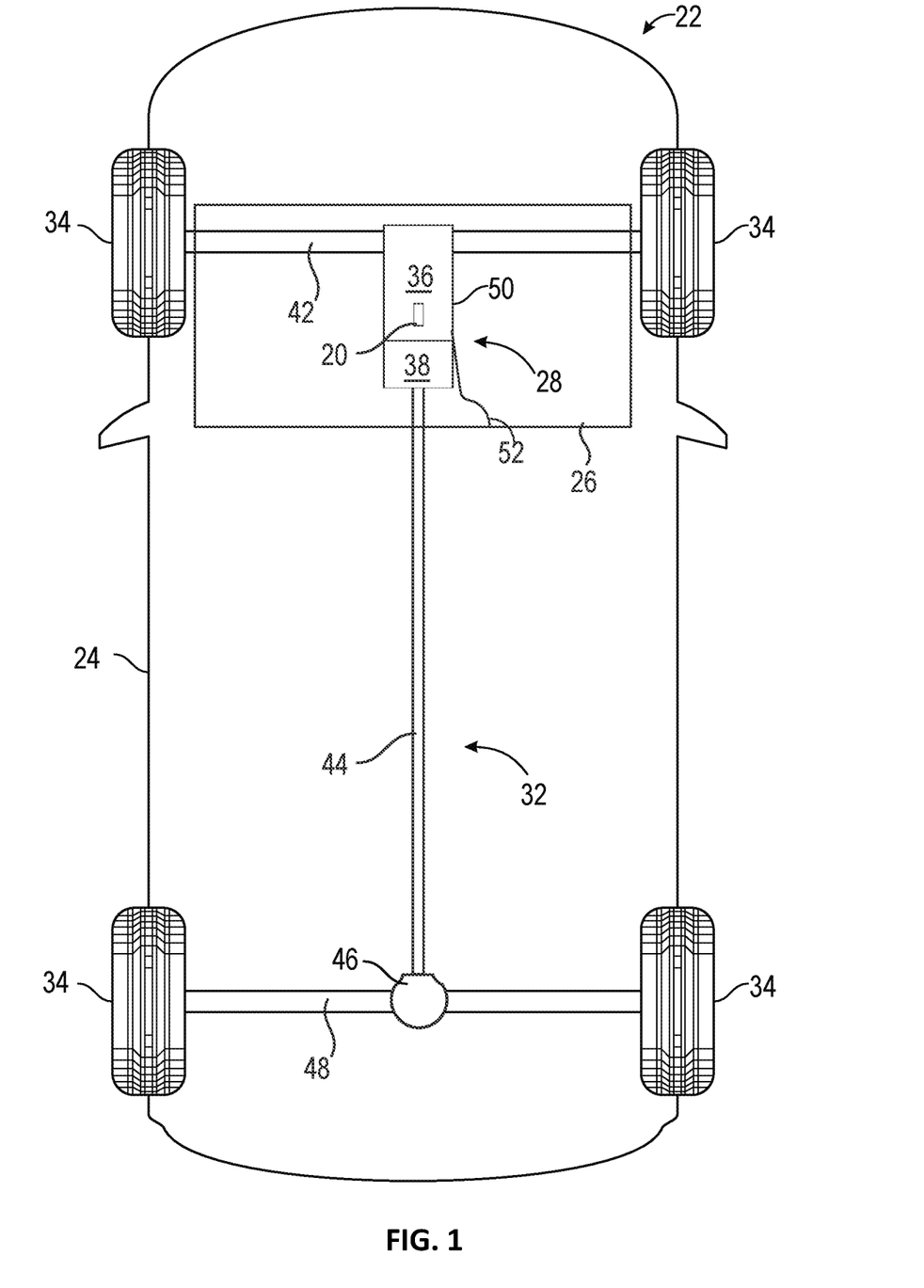
FIG. 1 is a schematic illustration of a vehicle with a propulsion system including an electric machine with a rotor grounding system, in accordance with various embodiments.

Referring to FIG. 1, In a number of embodiments, a rotor grounding system 20 is depicted within an application involving a vehicle 22. The vehicle 22 may be any one of a number of different types of land, sea, or air vehicles, and in certain embodiments, may for example, be a passenger automobile of any configuration. While the rotor grounding system 20 may be described within an embodiment of the vehicle 22, it is not limited to that embodiment but has application in a number of applications embodied in any environment where electric current management is useful in avoiding voltage discharge effects on rotating elements. In embodiments, the vehicle 22 may be any one of a number of different types of automobiles, such as, for example, a sedan, a wagon, a truck, or a sport utility vehicle, and may be two-wheel drive (i.e., rear-wheel drive or front-wheel drive), four-wheel drive, or all-wheel drive.

As depicted in FIG. 1, the vehicle 22 includes a body 24 arranged on, or integrated with, a chassis 26 which may form a part of the body and so references to a body 24 may include the chassis 26. In general, the body 24 and/or the chassis 26 serve as an electrical ground for systems on the vehicle 22. The chassis 26 may include a cradle that supports a propulsion system 28. The chassis 26 may also include, or be connected with, a front axle 42 and a rear axle 48, each of which is coupled with wheels 34. The propulsion system 28 may include any combination of an engine and/or an electric machine 36. In the current embodiment, the propulsion system 28 is embodied as an electric drive system and includes an electric machine 36 that provides the torque to drive the wheels 34. Any number of the wheels 34 may be coupled with the propulsion system 28 to propel the vehicle 22. The propulsion system 28 may include a gearset 38 through which the wheels 34 are supplied with torque from the electric machine 36.

In the embodiment illustrated in FIG. 1, the propulsion system 28 supplies torque to drive the wheels 34 through a driveline 32. In embodiments, the electric machine 36 may be integrated into the gearset 38 or may otherwise be coupled within the propulsion system 28. In various embodiments, the driveline 32 may be configured to couple the front wheels 34 with the propulsion system 28, such as through the gearset 38 and the axle 42. In other embodiments, including as illustrated, the driveline 32 may be configured to couple the rear wheels 34 with the propulsion system 28, such as through the gearset 38, a shaft 44, a gearbox 46, and the axle 48. The gearbox 46 transfers torque from the shaft 44 to the axle 48 and may provide a differential function in splitting torque to the wheels 34. In various embodiments the vehicle 22 may differ from that depicted in FIG. 1. For example, in certain embodiments the number of wheels 34, the drive axles 42, 48, and/or the style of the body 24 may vary.

The electric machine 36 may be any of various types of electric motors that operate to supply rotary torque to the driveline 32. The electric machine 36 may also be capable of operating as a generator receiving rotary torque from the driveline 32. The rotor grounding system 20 may be included in any of multiple locations within the propulsion system 28 or elsewhere where the electric machine 36, or another such machine, may be located. The electric machine 36 includes a housing 50 that is grounded to the body 24, such as at the chassis 26. A ground strap 52 may connect with the housing 50 and the body 24/chassis 26. In other embodiments, the housing 50 may be grounded by being connected directly to the body 24/chassis 26. As such, the body 24 serves as ground for electrical systems of the vehicle 22 including the electric machine 36, and the housing 50 is coupled directly therewith.

Figure 2:
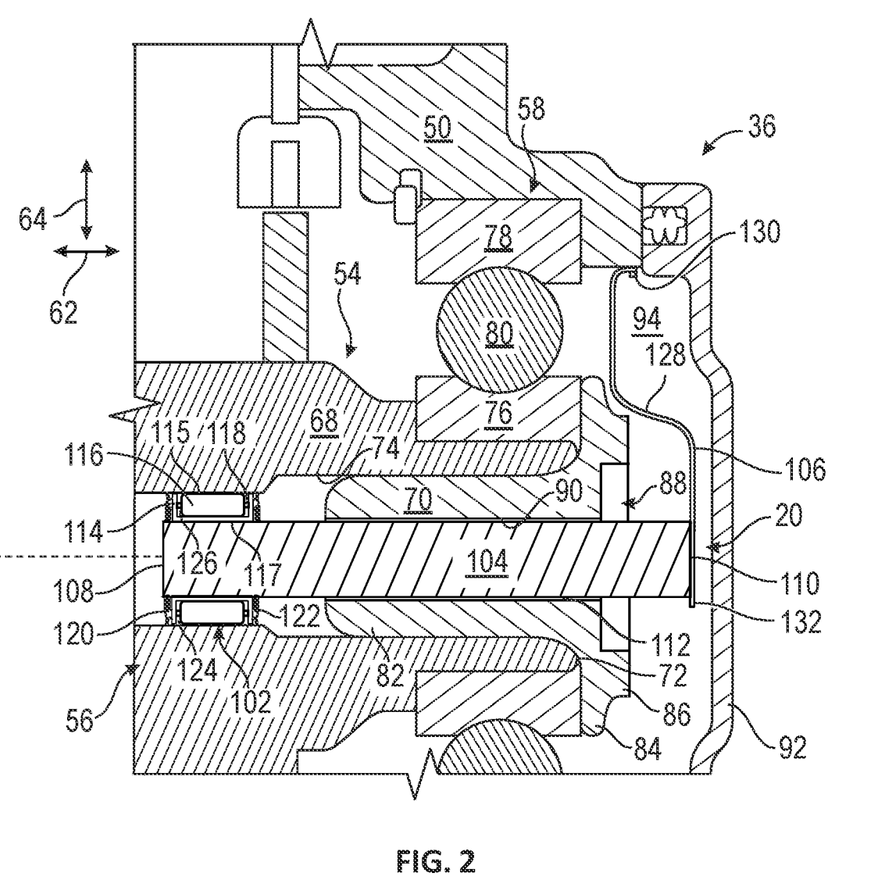
FIG. 2 is a schematic, fragmentary, cross sectional illustration of a part of the electric machine of the vehicle of FIG. 1, in accordance with various embodiments.

Referring to FIG. 2, a part of the electric machine 36 in the area of the rotor grounding system 20 is shown in cross section. The housing 50 of the electric machine 36 supports and/or is part of the stator of the electric machine 36. A rotor 54 of the electric machine 36 includes a shaft assembly 56 rotatably supported on the housing 50 by a number of bearings including a support bearing 58, which serves as support for the rotor 54. It should be understood that another such bearing will generally be provided at the opposite end of the rotor 54, and/or at other locations. The rotor 54 is configured to rotate about an axis 60 that extends longitudinally through the shaft assembly 56. As referred to herein, an axial direction 62 is the direction along, or parallel to, the axis 60. A radial direction 64 is the direction perpendicular to the axis 60 and, if extended, passes through the axis 60 along a radial line. In the current embodiment, the shaft assembly 56 includes a shaft 68 and an insert 70 fixed into the end 72 of the shaft 68. In other embodiments, the shaft assembly 56 may be a one-piece structure, or may include additional pieces. The shaft 68 has a bore 74 extending longitudinally along the axis 60. The bore 74 comprises an opening in the shaft assembly 56. The insert 70 is fixed in the bore 74, such as by threading, a press-fit, or by other means. The insert 70 may serve as a retainer for the support bearing 58.

In the current embodiment, the support bearing 58 is an assembly that includes an inner race 76 disposed against the shaft 68 and an outer race 78 disposed against to the housing 50. As such, the outer race 78 does not rotate and the inner race 76 rotates with the rotor 54. A number of rolling elements 80, are captured between the inner race 76 and the outer race 78 and provide a low friction rolling action for rotation of the rotor 54 within the housing 50. In the current embodiment, the rolling elements 80 are balls. In other embodiments, the rolling elements 80 may be configured in another physical form such as cylindrical rollers, pins, etc. In a number of embodiments, the support bearing 58 may take another form such as a journal bearing where the inner race 76 rides on the outer race 78 or where one element engages the housing 50 and rotatably supports the rotor 54.

The surface features of the inner race 76, the outer race 78 and the rolling elements 80 are configured to provide low friction for free rotation of the rotor 54 within the housing 50. Degradation of the surfaces may result in added friction, noise, vibration and other undesirable outcomes. Electric voltage induced in the rotor 54 and/or the shaft 68 may, if allowed to build-up, run from the shaft 68 to the housing 50 through the support bearing 58 and/or through the gearset 38 of FIG. 1. As noted above, that electric current may degrade the surfaces of the support bearing 58 or gearset 38. Accordingly, the rotor grounding system 20 is included to prevent a build-up of voltage differentials and to avoid such currents, including avoiding currents through the support bearing 58.

In the current embodiment, the insert 70 includes a cylindrical body 82 fixed in the bore 74 of the shaft 68. The insert 70 includes a flange 84 extending in the radial direction 64 outward around the end 72 of the shaft 68 and along the inner race 76 of the support bearing 58. A ring 86 of the insert 70 is annular in shape, extends in the axial direction 62 from the flange 84 on a side opposite the cylindrical body 82, and is centered on the axis 60. The ring 86 surrounds, and with the flange 84, defines a cavity 88 that is cylindrical in shape and is centered on the axis 60. The cavity 88 comprises an opening in the shaft assembly 56. The insert 70 has a through-bore 90 extending in the axial direction 62 through the cylindrical body 82 and through the flange 84. The through-bore 90 opens to the bore 74 of the shaft 68 and to the cavity 88 and as such, extends completely through the insert 70.

The electric machine 36 includes a cover 92 on the housing 50 closing a cavity 94 in the housing 50. The cover 92 is disposed generally around the end 72 of the shaft 68 and around the insert 70. The cavity 94 contains the support bearing 58. The cover 92 extends across the end of the insert 70 and is spaced from the ring 86 to allow the insert 70 to rotate as part of the rotor 54, while the cover 92 does not rotate. The cover 92 also extends radially across the end 72 of the shaft 68 and across the axis 60. The cover 92 is generally disk-like in shape and extends generally in the radial direction 64 outward from the axis 60. The cover 92 engages the housing 50 and is in sealed contact therewith.

The rotor grounding system 20 generally includes a bearing assembly 102, a discharge bar 104 and a support 106. The support 106 provides a grounding function and couples the discharge bar 104 with the housing 50. The discharge bar 104 and the support 106 are nonrotating elements. The bearing assembly 102 does not support the rotor 54 on the housing 50 but allows the shaft 68 to rotate around the discharge bar 104. The bearing assembly 102 has a relatively small diameter to reduce friction and fits within the shaft assembly 56. The ground circuit path of the rotor 54 is from the shaft 68 through the bearing assembly 102, the discharge bar 104 and the support 106, to the housing 50, all of which are made of conductive materials, which may be selected for low impedance. As noted above, the housing 50 is grounded to the body 24, such as by the ground strap 52 of FIG. 1. As such, the rotor 54 is continuously coupled to ground preventing a build-up of voltage differentials and avoiding current discharges through elements such as the support bearing 58. The frictional contact between the rotating and non-rotating parts of the rotor grounding system 20 is minimized to avoid significant drag and uses rolling action through the bearing assembly 102.

In the embodiment of FIG. 2, the discharge bar 104 is shaped as a solid cylindrical rod made of a conductive material and extends through the bore 74 of the shaft assembly 56 and through the through-bore 90 of the insert 70. The discharge bar 104 includes an end 108 inboard from the end 72 of the shaft 68. The end 108 is disposed at a location past the bearing assembly 102 within the bore 74 of the shaft 68 in the inboard direction. The discharge bar 104 includes another end 110 extending out from the cavity 88, which is fixed to, or otherwise held by, the support 106 within the cavity 94. A space 112 is annular in shape and separates the discharge bar 104 from the insert 70, providing clearance for relative rotation and minimizing friction. The bearing assembly 102 supports the end 108 of the discharge bar 104 and the support 106, holds the end 110 of the discharge bar 104. Consequently, the discharge bar 104 is centered in the through-bore 90 on the axis 60 and remains securely in position.

The bearing assembly 102 includes a cage 114 that is annular in shape and that engages against and around the discharge bar 104 as an inner race. The cage 114 supports a number of rollers 116 that are distributed around the circumference of the discharge bar 104 and that are shaped as elongated cylinders or are needle-like. In other embodiments, a different form of rolling elements or a journal-type bearing may be included instead of the rollers 116. In the current embodiment, the rollers 116 directly engage against the shaft 68 within the bore 74 with the shaft 68 as the outer race. The rollers 116 may be connected to the cage 114 by individual pins 118, or by other means, upon which they rotate between the inner race of the cage 114/discharge bar 104 and the outer race of the shaft 68. The bearing assembly 102 includes an outer circumference 115 and an inner circumference 117. The outer circumference 115 acts against the shaft assembly 56. Specifically, the rollers 116 define the outer circumference 115, which acts against the shaft 68 within the bore 74 by the rollers 116 riding against the shaft 68. The inner circumference 117 of the bearing assembly 102 acts against the discharge bar 104. Specifically, the cage 114 and/or the rollers 116 define the inner circumference 117, which acts against the discharge bar 104 by contacting, such as by being mounted on, or rolling on, the discharge bar 104.

An inboard seal 120 of the bearing assembly 102 provides a seal for the rollers 116 on their side away from the end 72 of the shaft 68. An outboard seal 122 of the bearing assembly 102 provides a seal for the rollers 116 on their side toward the end 72 of the shaft 68. Each of the inboard seal 120 and the outboard seal 122 engages the discharge bar 104 and the shaft 68 to provide a sealed chamber 124 within which the bearing assembly 102 is contained. The inboard and outboard seals 120, 122, respectively, may take a variety of forms and in the current embodiment are molded lip seals. The chamber 124 contains a lubricant 126 such as a conductive grease, for example, a lubricating grease with carbon filler for electrical conductivity. In embodiments, the carbon filler may be graphite. A grounding circuit is provided by the bearing assembly 102 between the shaft 68 and the discharge bar 104, which is optimized by the presence of the conductive lubricant 126 to provide a low impedance path. While the bearing assembly 102 may be referred to as a sacrificial bearing since it is in the low impedance path to ground, the ongoing discharge of voltage potentials generally avoids current flows that are deteriorative. However, since the bearing assembly 102 is superfluous to the support of the rotor 54 in the housing 50, any effects are of minimal effect to the support and smooth rotation of the rotor 54.

The support 106 provides a mounting/support function for the discharge bar 104, holding its end 110 in a centered position on the axis 60. The support 106 comprises a cantilevered beam that includes an offset 128 and may be referred to as a beam. The support 106 includes an end 130 fixed to the housing 50 and extends inward in the radial direction 64 across the axis 60 to an end 132. The support 106 engages the end 110 of discharge bar 104 and the support 106 may be fixed to the discharge bar 104 at the end 110 such as by welding, or another retention mechanism may be provided to maintain contact. The support 106 is conductive to provided electrical coupling between the discharge bar 104 and the housing 50. During assembly of the electric machine 36, the bearing assembly 102 may be mounted on the discharge bar 104 with the cage 114 engaging the discharge bar 104, such as with a press-fit. The subassembly may then be translated into the bore 74 of the shaft 68. The support bearing 58 may be placed in its position on the housing 50 and the insert 70 may be inserted into the bore 74 of the shaft 68. The support 106 may then be attached to the housing 50. The support 106 may be attached to the discharge bar 104 before or after its insertion, completing the discharge circuit.

Figure 3:
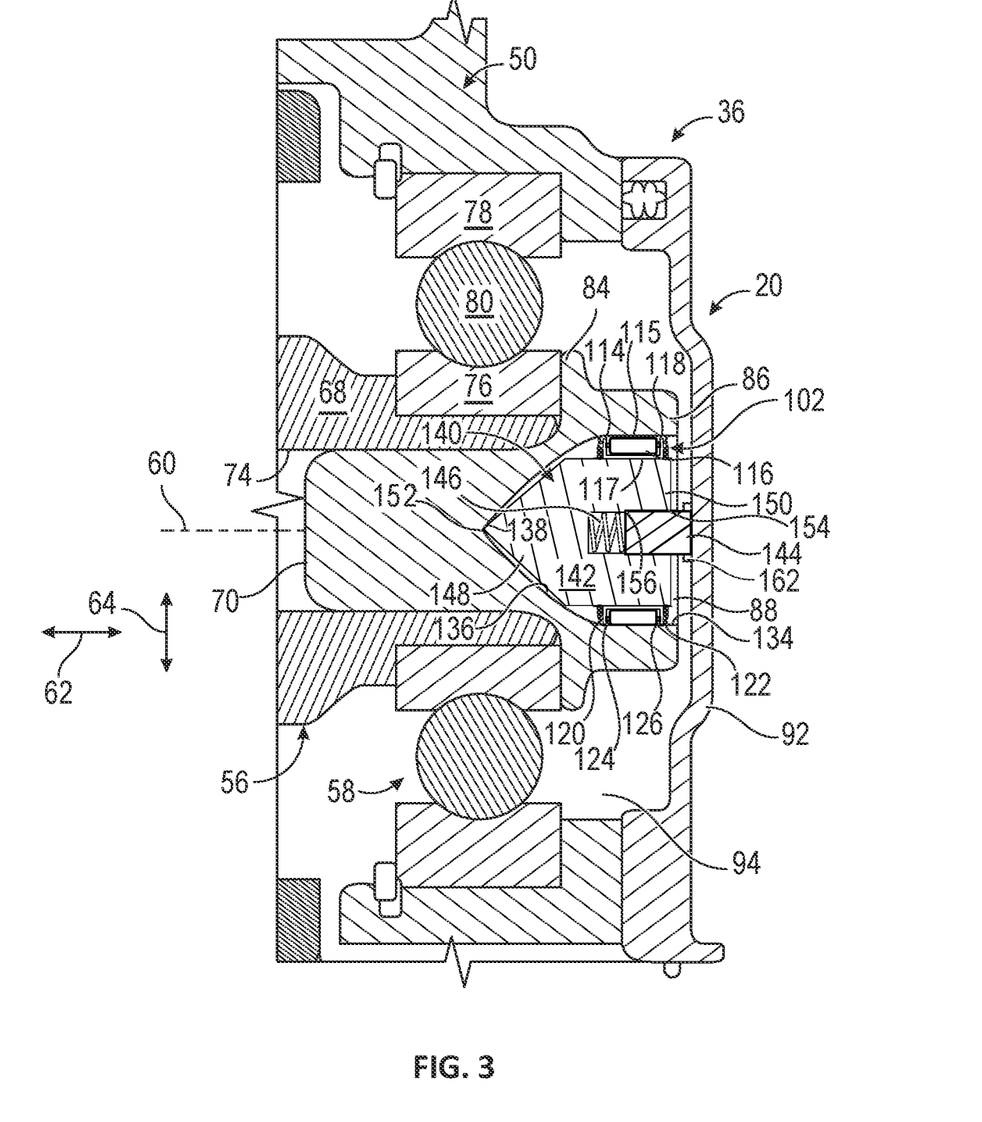
FIG. 3 is a schematic, fragmentary, sectional illustration of a part of the electric machine of the vehicle of FIG. 1, with a conical discharge bar, in accordance with various embodiments.

Referring to FIG. 3, an alternative to the discharge circuit is illustrated. The insert 70 may omit the through-bore 90 and may have a wall 136 that is conical shaped facing into the cavity 88, and which transitions to a wall 134 that is cylindrical in shape and faces into the cavity 88. As used herein the terms conical/cone include true cone shapes with straight sides and also includes shapes that are cone-like, such as those that have bowed or curves sides leading from their apex (a.k.a. vertex). The wall 136 includes an apex 138 at the axis 60. As defined above, in embodiments the wall 136 leading away from the apex 138 may be linear, convex or concave defining a cone-like structure facing the cavity 88. The discharge bar 104 of FIG. 2 may be replaced by a discharge bar 140 that is an assembly of a bar section 142, a bar section 144 and a spring 146. The bar section 142 includes a conical segment 148 and a cylindrical segment 150, both contained in the cavity 88. The conical segment 148 includes a point 152 that engages the wall 136 at the apex 138. The bar section 142 has a bore 154 that is stepped to have an inboard smaller diameter and an outboard larger diameter with a shoulder 156 in a castle-type joint. The bore 154 opens facing the cover 92. The bar section 144 is partially disposed in the bore 154 with the spring 146 captured in the bore 154 behind the bar section 144. The spring 146 biases the point 152 against the wall 136 at the apex 138 to maintain low friction contact. The cover 92 includes an anti-rotation feature 162, that may be keyed to the bar section 144.

The bearing assembly 102 includes the cage 114 which engages around the bar segment 150. The cage 114 supports the number of rollers 116 that are distributed around the circumference of the bar segment 150 and that are shaped as elongated cylinders or are needle-like. In other embodiments, a different form of rolling elements or a journal-type bearing may be included instead of the rollers 116. In the current embodiment, the rollers 116 directly engage the ring 86 of the insert 70 within the cavity 88 as the outer race and engage the bar segment 150 (directly or through the cage 114), as an inner race. The rollers 116 are connected to the cage 114 by the pins 118 upon which they rotate between the inner race of the bar segment 150 and the outer race of the ring 86.

The bearing assembly 102 includes the outer circumference 115 and the inner circumference 117. The outer circumference 115 acts against the shaft assembly 56. Specifically, the rollers 116 define the outer circumference 115, which acts against the insert 70 within the cavity 88 by the rollers 116 riding against the insert 70. The inner circumference 117 of the bearing assembly 102 acts against the discharge bar 140. Specifically, the cage 114/rollers 116 define the inner circumference 117, which acts against the discharge bar 140 by contacting, such as by being mounted on, or rolling against, the discharge bar 140 at the cylindrical segment 150 of the bar section 142.

An inboard seal 120 of the bearing assembly 102 provides a seal for the rollers 116 on their side away from the cover 92. An outboard seal 122 of the bearing assembly 102 provides a seal for the rollers 116 on their side toward the cover 92. Each of the inboard seal 120 and the outboard seal 122 engages the bar section 142 and the ring 86 to provide a chamber 124 within which the bearing assembly 102 is contained and sealed. The inboard and outboard seals 120, 122 respectively, may take a variety of forms and in the current embodiment are molded lip seals. The chamber 124 contains the lubricant 126 for electrical conductivity. A grounding circuit is provided by the bearing assembly 102 between the shaft 68 and the housing 50. The grounding circuit includes the insert 70, the bearing assembly 102, the discharge bar 140 and the cover 92, which is optimized by the presence of the conductive lubricant 126 to provide a low impedance path. The discharge bar 140 includes the bar section 142, the bar section 144, and the spring 146. The point 152 of the discharge bar 140 provides an additional path to ground with low friction contact due to its pointed nature at the axis 60. The discharge bar 140 may be readily adapted to inclusion in existing electric machines with minimal changes.

For the embodiment of FIG. 3, assembly includes mounting the insert 70 to the shaft 68, such as by threads or a press fit within the bore 74. The insert 70 may or may not include features for retention of the support bearing 58. The bearing assembly 102 is mounted on the outer diameter of the cylindrical segment 150 of the bar section 142 of the discharge bar 140. The spring 146 may be placed on the bar section 144 and the pair may be inserted into the bore 154, which may be done before or after the insert 70 is mounted to the shaft 68. The cover 92 is fixed to the housing 50 engaging the bar section 144. In embodiments, the bar section 144 may be fixed to the cover 92 as the support (similar to the support 106), before being inserted into the bore 154. The bar section 144 then acts as a pilot for positioning the cover 92 during assembly. Accordingly, the discharge bar 140 (as an assembly), is disposed in the cavity 88 and the bearing assembly 102 will run on the surface of the insert 70 facing into the cavity 88. The cover 92, as a support, couples the discharge bar 140 with the housing 50.

Figure 4:
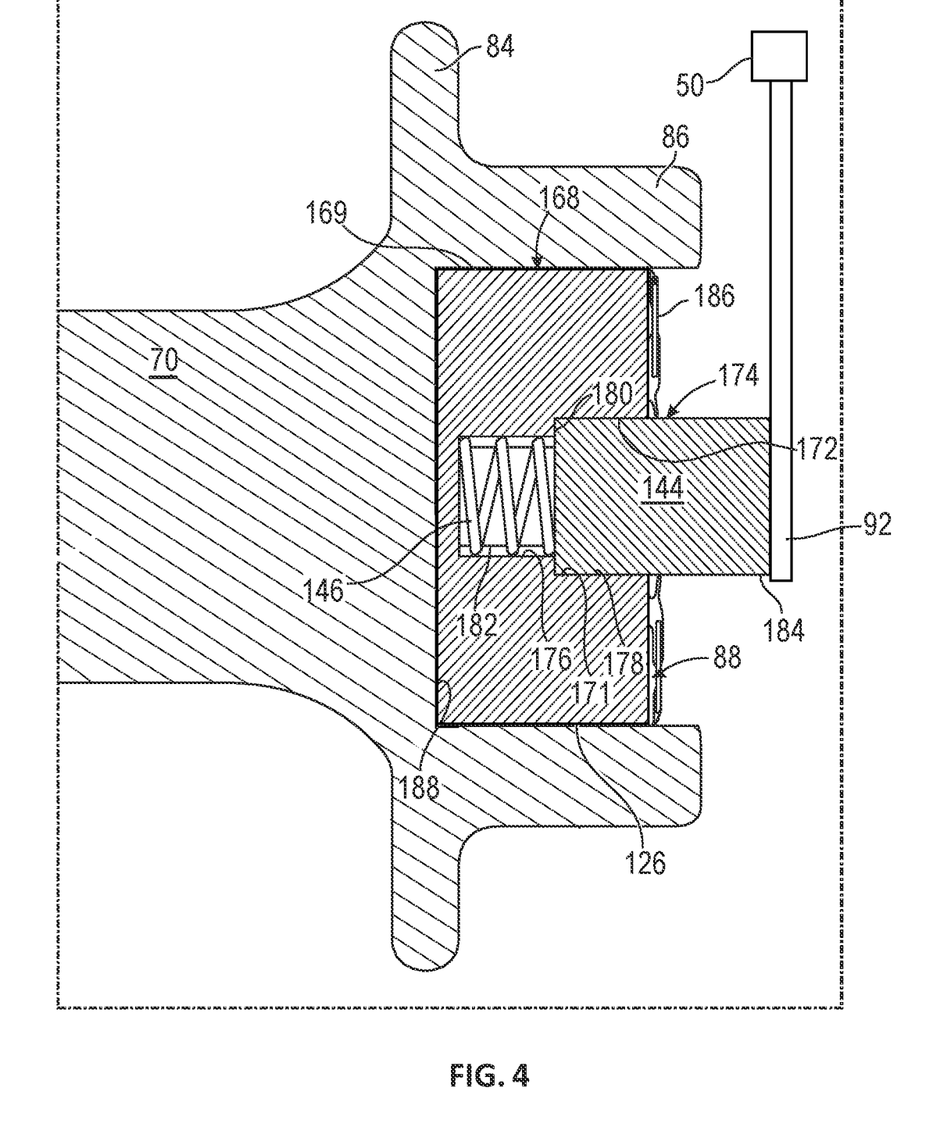
FIG. 4 is a schematic, fragmentary, sectional illustration of a part of the electric machine of the vehicle of FIG. 1, with a journal bearing, in accordance with various embodiments.

Referring to FIG. 4, an alternative embodiment includes the insert 70 with the cavity 88, that is cylindrical in shape, and no through-bore. The cavity 88 contains a bearing assembly 168 formed as a journal bearing and shaped as a conductive cylinder. A bore 172 extends partially through the bearing assembly 168. The bore 172 again provides a castle-type joint with a discharge bar 174 that is an assembly of the bar section 144 and the spring 146. The bore 172 is stepped having an inboard smaller diameter 176 and an outboard larger diameter 178 with a shoulder 180 at the junction between the smaller diameter 176 and the larger diameter 178. The bore 172 opens facing the cover 92. The bar section 144 is partially disposed in the bore 172 with the spring 146 captured in the bore 172 behind the bar section 144. The spring 146 biases the bearing assembly 168 against a wall 188 of the insert 70 to maintain contact. The bar section 144 engages the cover 92 as the support (similar to the support 106). The cover 92, as a support, couples the discharge bar 174 with the housing 50. A discharge circuit is provided from the insert 70 to the housing 50 through the bearing assembly 168, and the discharge bar 174, including its bar section 144 and the spring 146.

The bearing assembly 168 includes an outer circumference 169 and an inner circumference 171. The outer circumference 169 acts against the shaft assembly 56 at the ring 86 of the insert 70. "Acts against" means the cylinder of the bearing assembly 168 defines the outer circumference 169, which is disposed against the insert 70 within the cavity 88 and the outer circumference 169 rids against the insert 70 of the shaft assembly 56. The inner circumference 171 of the bearing assembly 168 acts against the discharge bar 174. Specifically, that means the cylinder of the bearing assembly 168 defines the inner circumference 171 in the bore 172, which is disposed against the discharge bar 174 by contacting the discharge bar 174 at the bar section 144 and the spring 146.

The bar section 144 includes a smaller diameter segment 182 disposed in the smaller diameter 176 of the bore 172 and a larger diameter segment 184 disposed in the larger diameter 178 of the bore 172 and engaging the shoulder 180. The shoulder 180 acts as a stop for the bar section 144. The spring 146 is embodied as a coil spring and encircles the small diameter segment 182.

The cavity 88 may contain the conductive lubricant 126 for a low impedance path from the shaft assembly 56 to the bearing assembly 168. A seal assembly 186 may close the cavity 88 and may engage the ring 86 of the insert 70 and may engage the bar section 144 at the larger diameter segment 184 to close the cavity 88 and contain the conductive lubricant 126. The bearing assembly 168 may be a sacrificial bearing as it provides redundant, minimal support for the rotor 54. As the ground circuit provides continuous voltage discharge, current buildups are avoided and current related deterioration is minimized.

Through the foregoing embodiments, rotor shaft electrical grounding is continuously provided, avoiding electrical current type deterioration of components such as bearings and/or gears. A sacrificial bearing assembly with conductive lubricant provides low impedance and continuous paths to ground, effectively avoiding sporadic voltage discharges. A compact package is provided for addition to motor designs without major modifications and for ready assembly into the electric machine. Bearings and other components are protected with reliable efficient discharge components that may be configured as a drop in solution with no additional package space needed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor grounding system for an electric machine, the system comprising:
   a rotor including a shaft assembly configured to rotate about an axis, the shaft assembly including a shaft defining a bore extending along the axis;
   a housing containing a support bearing supporting the shaft assembly on the housing for rotation of the rotor;
   a bearing assembly having an outer circumference and an inner circumference, the outer circumference disposed against the shaft assembly in the bore;
   an insert extending into the bore and contacting the support bearing, the insert defining a through-bore; and
   a discharge bar extending through the bore, through the through-bore, and through at least a part of the bearing assembly, the inner circumference disposed against the discharge bar,
   wherein a discharge circuit is defined between the rotor and the housing, the discharge circuit extending through the bearing assembly and the discharge bar,
   wherein the discharge circuit comprises a support coupling the discharge bar with the housing, the support configured to support the discharge bar and to ground the discharge bar to the housing,
   wherein the bearing assembly is annular in shape and engages against and around the discharge bar as an inner race of the bearing assembly, wherein the insert includes a flange that contacts the support bearing and a cylindrical body that is disposed in the bore and that defines the through-bore, wherein the bearing assembly includes rollers that contact the shaft and the discharge bar.

2. The rotor grounding system of claim 1, wherein the shaft assembly defines an opening, wherein the discharge bar is disposed in the opening.

3. The rotor grounding system of claim 1, wherein the support is configured as a cantilevered beam.

4. The rotor grounding system of claim 1, wherein the bearing assembly includes a cage on the shaft assembly.

5. The rotor grounding system of claim 1, wherein in the discharge circuit, the discharge bar is disposed between the bearing assembly and the support.

6. The rotor grounding system of claim 1, a wherein the support is fixed to the housing.

7. The rotor grounding system of claim 1, wherein the bearing assembly does not directly engage the housing.

8. The rotor grounding system of claim 1, wherein the discharge bar extends along the axis.

9. The rotor grounding system of claim 1, wherein the discharge bar includes an end that is fixed to the support.

10. The rotor grounding system of claim 1, comprising an electrically conductive lubricant disposed around the bearing assembly, configured to provide a low impedance path from the rotor, through the bearing assembly, and to the housing.

11. A rotor grounding system for an electric machine, the system comprising:
- a rotor including a shaft assembly configured to rotate about an axis, the shaft assembly including a shaft defining a bore extending along the axis;
- a housing surrounding the shaft assembly and containing a support bearing, the shaft assembly supported for rotation of the rotor in the housing;
- a bearing assembly having an outer circumference and an inner circumference, the outer circumference disposed against the shaft assembly in the bore with the bearing assembly disposed inside the shaft assembly;
- an insert extending into the bore and contacting the support bearing, the insert defining a through-bore; and
- a discharge bar extending through the bore, through the through-bore, and through at least a part of the bearing assembly, the inner circumference disposed against the discharge bar, with the discharge bar extending into the bearing assembly,
- wherein an electric discharge circuit is defined between the rotor and the housing, the electric discharge circuit extending through the bearing assembly and the discharge bar,
- wherein the discharge circuit comprises a support coupling the discharge bar with the housing, the support configured to support the discharge bar and to ground the discharge bar to the housing,
- wherein the bearing assembly is annular in shape and engages against and around the discharge bar as an inner race of the bearing assembly, wherein the insert includes a flange that contacts the support bearing and a cylindrical body that is disposed in the bore and that defines the through-bore, wherein the bearing assembly includes rollers that contact the shaft and the discharge bar.

12. The rotor grounding system of claim 11, wherein the shaft assembly defines an opening, wherein the discharge bar is disposed in the opening.

13. The rotor grounding system of claim 11, wherein the support is configured as a cantilevered beam and as a part of the electric discharge circuit.

14. The rotor grounding system of claim 11, wherein the bearing assembly includes a cage on the shaft assembly.

15. The rotor grounding system of claim 11, wherein in the discharge circuit, the discharge bar is disposed between the bearing assembly and the support.

16. The rotor grounding system of claim 11, a wherein the support is fixed to the housing.

17. The rotor grounding system of claim 11, wherein the bearing assembly does not directly engage the housing.

18. The rotor grounding system of claim 11, comprising a seal enclosing the bearing assembly; and an electrically conductive lubricant disposed around the bearing assembly, the electrically conductive lubricant configured to provide a low impendence path from the rotor, through the bearing assembly, and to the housing.

19. The rotor grounding system of claim 11, wherein the discharge bar includes a first end that is fixed to the support and includes a second end that is supported by the bearing assembly.

20. A rotor grounding system for an electric machine of a vehicle having a body, the rotor grounding system comprising:
- a rotor including a shaft assembly configured to rotate about an axis and including a shaft defining a bore and extending along the axis;
- a housing surrounding the shaft assembly, the housing containing a support bearing supporting the shaft assembly on the housing so that the shaft assembly is supported for rotation of the rotor in the housing;
- a bearing assembly having an outer circumference and an inner circumference, the outer circumference disposed against the shaft assembly in the bore with the bearing assembly disposed inside the shaft assembly;
- an insert extending into the bore and contacting the support bearing, the insert defining a through-bore;
- a discharge bar extending through the bore, through the through-bore, and through at least a part of the bearing assembly, the inner circumference disposed against the discharge bar, with the discharge bar extending into the bearing assembly; and
- wherein a discharge circuit comprises a support coupling the discharge bar with the housing, wherein the support is configured to support the discharge bar and to ground the discharge bar to the housing,
- wherein the bearing assembly is annular in shape and engages against and around the discharge bar as an inner race of the bearing assembly,
- wherein the insert includes a flange that contacts the support bearing and a cylindrical body that is disposed in the bore and that defines the through-bore, wherein the bearing assembly includes rollers that contact the shaft and the discharge bar,
- wherein the electric discharge circuit is defined between the rotor and the body, the electric discharge circuit extending through the bearing assembly, the discharge bar, the support, and the housing.

* * * * *

UNITED STATES PATENT AND TRADEMARK OFFICE
CERTIFICATE OF CORRECTION

| | |
|---|---|
| PATENT NO. | : 12,366,267 B2 |
| APPLICATION NO. | : 17/933146 |
| DATED | : July 22, 2025 |
| INVENTOR(S) | : Sen Jiang Zhou, Jack M Gayney and Alireza Fatemi |

It is certified that error appears in the above-identified patent and that said Letters Patent is hereby corrected as shown below:

In the Claims

Claim 6 - Column 10, Line 60 - should read, "The rotor grounding system of claim 1, wherein the support is fixed to the housing", not "The rotor grounding system of claim 1, a wherein the support is fixed to the housing".

Signed and Sealed this
Twenty-eighth Day of October, 2025

John A. Squires
*Director of the United States Patent and Trademark Office*